United States Patent
Konopnicki

(10) Patent No.: US 7,895,208 B2
(45) Date of Patent: Feb. 22, 2011

(54) DEVICE, SYSTEM, AND METHOD OF CREATING VIRTUAL SOCIAL NETWORKS BASED ON WEB-EXTRACTED FEATURES

(75) Inventor: David Konopnicki, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/037,091

(22) Filed: Feb. 26, 2008

(65) Prior Publication Data

US 2009/0216773 A1 Aug. 27, 2009

(51) Int. Cl.
G06F 7/00 (2006.01)
G06F 17/30 (2006.01)
(52) U.S. Cl. ............ 707/738; 707/741; 707/748; 707/749
(58) Field of Classification Search ............ 707/999.01, 707/710, 731, 732, 737, 738, 741, 748, 749
See application file for complete search history.

(56) References Cited

U.S. PATENT DOCUMENTS

| | | | |
|---|---|---|---|
| 7,707,246 B1 * | 4/2010 | Issa et al. | 709/204 |
| 2006/0123127 A1 * | 6/2006 | Littlefield | 709/229 |
| 2006/0294134 A1 * | 12/2006 | Berkhim et al. | 707/102 |
| 2007/0112761 A1 * | 5/2007 | Xu et al. | 707/5 |
| 2007/0156636 A1 * | 7/2007 | Norton et al. | 707/1 |
| 2007/0168216 A1 * | 7/2007 | Lemelson | 705/1 |
| 2007/0208729 A1 * | 9/2007 | Martino | 707/5 |
| 2007/0214097 A1 * | 9/2007 | Parsons et al. | 706/12 |
| 2007/0299737 A1 * | 12/2007 | Plastina et al. | 705/26 |
| 2008/0201225 A1 * | 8/2008 | Maharajh et al. | 705/14 |
| 2009/0154899 A1 * | 6/2009 | Barrett et al. | 386/124 |
| 2009/0164301 A1 * | 6/2009 | O'Sullivan et al. | 705/10 |

FOREIGN PATENT DOCUMENTS

WO WO2007103482 9/2007

* cited by examiner

*Primary Examiner*—John E Breene
*Assistant Examiner*—Mark E Hershley

(57) ABSTRACT

Device, system, and method of creating virtual social networks based on web-extracted features. For example, a method for creating virtual social networks based on web-extracted data includes: accessing through a global communication network a first content item and a second content item, wherein each one of the first and second content items is selected from the group consisting of: an image, a video, text, and metadata; extracting data corresponding to a first feature from the first content item; extracting data corresponding to a second feature from the second content item; and based on a common attribute of the first and second features, clustering into a cluster a first identifier of a first user associated with the first content item and a second identifier of a second user associated with the second content item.

20 Claims, 2 Drawing Sheets

DEVICE, SYSTEM, AND METHOD OF CREATING VIRTUAL SOCIAL NETWORKS BASED ON WEB-EXTRACTED FEATURES

FIELD

Some embodiments of the invention are related to the field of electronic communication systems able to provide virtual social network services.

BACKGROUND

Some electronic communication systems allow users to create or join a virtual community, as well as to engage in virtual social network services. For example, some Internet web-sites (e.g., "MySpace.com" or "Facebook.com") provide a collection of various ways for users to interact. User interactions include, for example, online chat activities, instant messaging, sharing of photographs and videos, file sharing, writing into a "blog" system or reading from a "blog" system, or the like.

Some systems allow a user to import or reuse his contact list or electronic mail (email) address book, and to utilize such contacts or email addresses for creation of a virtual social network. This mechanism allows the user to create a virtual social network which includes persons that the user already knows, but may not allow the user to create a virtual social network with persons that the user does not yet know.

SUMMARY

Some embodiments include, for example, devices, systems, and methods of creating virtual social networks based on web-extracted features.

In some embodiments, for example, a method for creating virtual social networks based on web-extracted data includes: accessing through a global communication network a first content item and a second content item, wherein each one of the first and second content items is selected from the group consisting of: an image, a video, text, and metadata; extracting data corresponding to a first feature from the first content item; extracting data corresponding to a second feature from the second content item; and based on a common attribute of the first and second features, clustering into a cluster a first identifier of a first user associated with the first content item and a second identifier of a second user associated with the second content item.

In some embodiments, for example, an apparatus for creating virtual social networks based on web-extracted data includes: a crawler module to access through a global communication network a first content item and a second content item, wherein each one of the first and second content items is selected from the group consisting of: an image, a video, text, and metadata; one or more content analyzers to extract data corresponding to a first feature from the first content item, and to extract data corresponding to a second feature from the second content item; and a clustering module to cluster into a cluster, based on a common attribute of the first and second features, a first identifier of a first user associated with the first content item and a second identifier of a second user associated with the second content item.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
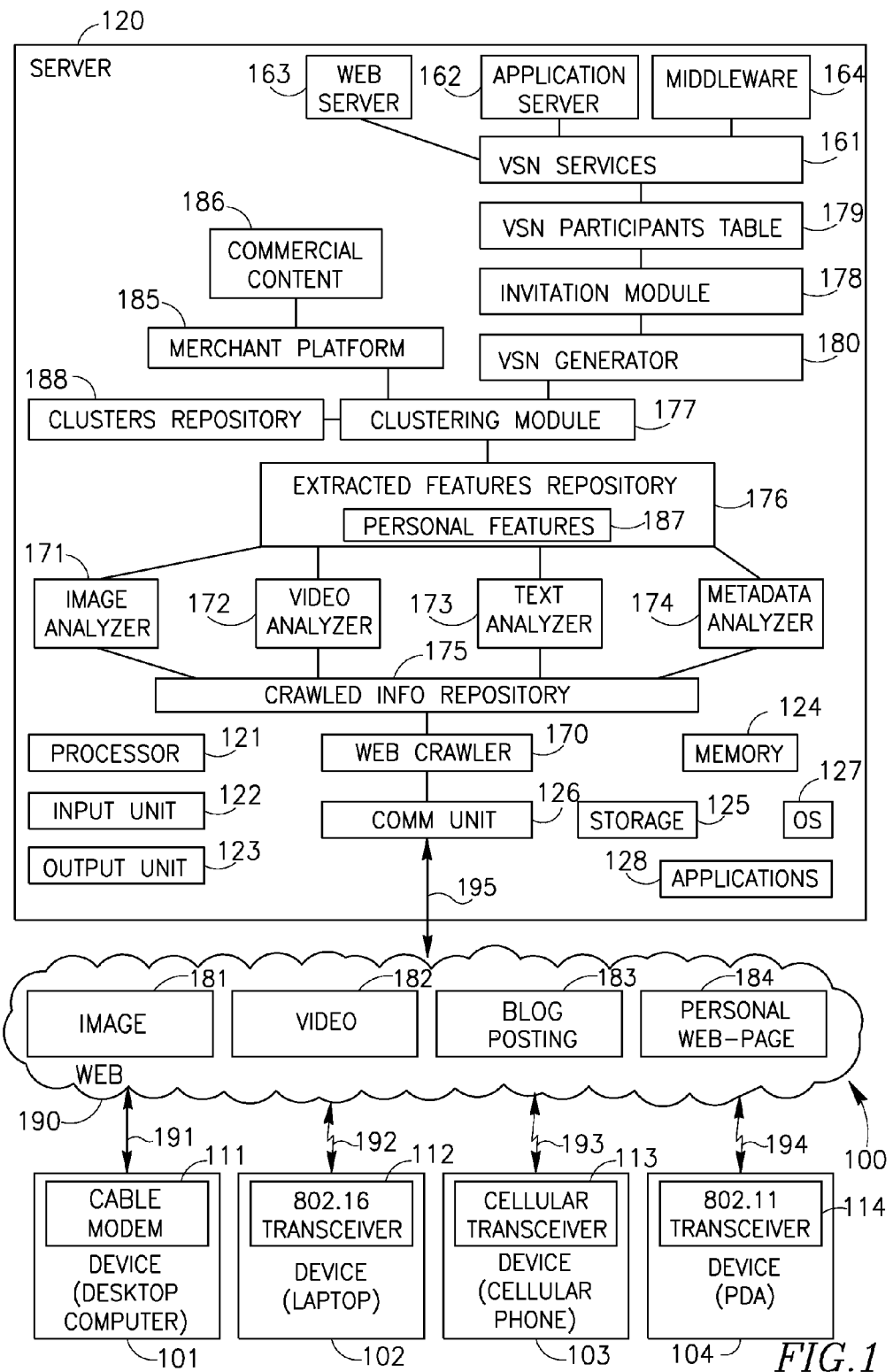
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), Zig-Bee™, Ultra-Wideband (UWB), Global System for Mobile communication (GSM), 2 G, 2.5 G, 3 G, Third Generation Partnership Project (3GPP), 3.5 G, or the like. Some embodiments may be used in conjunction with various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

The terms "social network" or "virtual social network" or "VSN" as used herein include, for example, a virtual community, an online community, a community or assembly of online representations corresponding to users of computing devices, a community or assembly of virtual representations corresponding to users of computing devices, a community or assembly of virtual entities (e.g., avatars, usernames, nicknames, or the like) corresponding to users of computing devices, or the like.

In some embodiments, a virtual social network includes at least two users; in other embodiments, a virtual social network includes at least three users. In some embodiments, a virtual social network includes at least one "one-to-many" communication channels or links. In some embodiments, a virtual social network includes at least one communication channel or link that is not a point-to-point communication channel or link. In some embodiments, a virtual social network includes at least one communication channel or link that is not a "one-to-one" communication channel or link.

The terms "social network services" or "virtual social network services" as used herein include, for example, one or more services which may be provided to members or users of a social network, e.g., through the Internet, through wired or wireless communication, through electronic devices, through wireless devices, through a web-site, through a stand-alone application, through a web browser application, or the like. In some embodiments, social network services may include, for example, online chat activities; textual chat; voice chat; video chat; Instant Messaging (IM); non-instant messaging (e.g., in which messages are accumulated into an "inbox" of a recipient user); sharing of photographs and videos; file sharing; writing into a "blog" or forum system; reading from a "blog" or forum system; discussion groups; electronic mail (email); folksonomy activities (e.g., tagging, collaborative tagging, social classification, social tagging, social indexing); forums; message boards; or the like.

The terms "web" or "Web" as used herein includes, for example, the World Wide Web; a global communication system of interlinked and/or hypertext documents, files, web-sites and/or web-pages accessible and/or publicly available through the Internet or through a global communication network; including text, images, videos, multimedia components, hyperlinks, or other content.

At an overview, some embodiments include devices, systems, and methods of creating virtual social networks based on web-extracted personal features. For example, a web crawler crawls the World Wide Web, and downloads text, images, videos, blog postings, personal web-pages, or the like. The crawled content is analyzed by one or more analyzers, for example, an image analyzer, a video analyzer, a text analyzer, and/or a metadata analyzer, which extract personal features from the crawled content. A clustering module creates a cluster of users who published online content having a common attribute.

For example, the image analyzer determines that an online image was taken in London; the video analyzer determines that an online video was taken in London; the text analyzer determines that a blog posting relates to a visit in London; the metadata analyzer determines that an online content items is associated with London; or the like. Accordingly, the clustering module creates a cluster of users associated with London. Similarly, a cluster may include a group of users who possess a common article, who visited a common landmark, who showed interest in a common hobby, or the like.

The generated clusters may be used in order to generate virtual social networks. For example, the system may send to users of a particular cluster invitations to join a virtual social network associated with the common attribute of the cluster. Additionally or alternatively, the clusters may be used in order to selectively send commercial content to users that are members of a particular clusters. For example, based on the common attribute of the cluster, a merchant platform may send to the members of the cluster relevant advertisements, promotions, or commercial offers.

The term "personal features" as used herein includes, for example, features or data extracted by an analysis of web-content uploaded, published, or otherwise shared or made publicly available online by a user of the World Wide Web or of other global communication network. Although portions of the discussion herein relate, for demonstrative purposes, to extraction and utilization of personal features, some embodiments may extract and/or utilize data or features which may not necessarily be "personal" in their nature, for example, business-related data, web-content uploaded or published or shared by a business entity, web-content uploaded or published or shared by a group of users or by a family, or the like.

FIG. 1 schematically illustrates a block diagram of a system 100 in accordance with some demonstrative embodiments of the invention. System 100 includes multiple client devices, for example, devices 101-104. Devices 101-104 may include wired computing devices and/or wireless computing devices. For example, device 101 may be a desktop computer having a cable modem 111; device 102 may be a laptop computer having an IEEE 802.16 transceiver 112; device 103 may be a cellular phone having a cellular transceiver 113; and device 104 may be a PDA device having an IEEE 802.11 transceiver 114. Each one of devices 101-104 is able to access the World Wide Web ("Web") 190 through the Internet global communication network, using wired and/or wireless communication links 191-194.

System 100 further includes a server 120 implemented using suitable hardware components and/or software components, for example, a processor 121, an input unit 122, an output unit 123, a memory unit 124, a storage unit 125, and a communication unit 126.

Processor 121 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 121 executes instructions, for example, of an Operating System (OS) 127 or of one or more applications 128.

Input unit 122 includes, for example, a keyboard, a keypad, a mouse, a touch-pad, a joystick, a track-ball, a stylus, a microphone, or other suitable pointing unit or input device. Output unit 123 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 124 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 125 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 124 and/or storage unit 125, for example, store data processed by server 120.

Communication unit 126 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Optionally, communication unit 126 includes, or is associated with, one or more antennas. In some embodiments, communication unit 126 allows server 120 to access the Web, for example, through a wired or wireless communication link 195.

In some embodiments, some or all of the components of server 120 are enclosed in a common housing or packaging, and are interconnected or operably associated using one or more wired or wireless links. In other embodiments, components of server 120 are distributed among multiple or separate devices or locations.

A first user utilizes the device 101 in order to post online, to submit online, to share, to upload, or to otherwise publish online an image 181. The image 181 may be, for example, a photograph, a drawing, an original image, a scanned image, a file representing or including graphics or graphical element (s), or the like. In a demonstrative example, image 181 includes a photograph of the first user holding a Sprite bottle. Optionally, the filename of image 181 includes the string "Sprite". Optionally, when publishing or sharing the image 181, the first user provides his email address or other contact detail, for example, "User1@domain.com".

A second user utilizes the device 102 in order to post online, to submit online, to share, to upload, or to otherwise publish online a video 182. The video 182 may be, for example, a file having digital data representing a moving picture, a set or sequence of images, a streaming video, a non-streaming video, a video which optionally includes an audio track, an encoded or non-encoded video, an audio/video file utilizing one or more compression schemes or encoding schemes for encoding or compression of audio and/or video, or the like. In a demonstrative example, video 182 is a two-minute audio/video file, which includes a five-seconds portion showing the second user and the Statue of Liberty in the background. Optionally, the video file is Optionally video 182 is published online with a filename "Statue_of_Liberty.jpg" (e.g., a filename determined by the second user prior to uploading the video file); and/or with an "alt" tag or title of "My trip to the Statue of Liberty". When publishing or sharing the video 182, the second user provides his email address or other contact detail, for example, "User2@domain.com".

A third user utilizes the device 103 in order to post online, to submit online, to share, to upload, or to otherwise publish online a web-log ("blog") posting 183. The blog posting 183 may be, for example, an original or new posting, a response to a previous posting, a textual posting, a posting which includes text and other objects (e.g., images, videos, a signature), a posting into a forum or a threaded mechanism, a "talk-back" posting, a comment to an online article, a comment to an online posting, or the like. In a demonstrative example, the blog posting 183 is a textual posting which includes the phrase "I enjoy drinking Sprite". Optionally, when publishing or sharing the blog posting 183, the third user provides his email address or other contact detail, for example, "User3@domain.com".

A fourth user utilizes the device 104 in order to post online, to submit online, to share, to upload, or to otherwise publish online other personal content, for example, a personal web-page 184. The personal web-page 184 may be, for example, a personal web-site, one or more hosted web-pages, a portion of a web-page, a user profile posted onto a virtual social network, or the like. In a demonstrative example, the personal web-page 184 may include the phrase "Last month I visited New York City, saw the Statue of Liberty, and bought a red shirt". Optionally, when publishing or sharing the personal web-page 184, the fourth user provides his email address or other contact detail, for example, "User4@domain.com".

Server 120 includes a web crawler 170, for example, a web "spider" or "ant", a web robot or "bot", an automatic indexer, a program or software agent or automated script able to browse the Web 190 in a methodical or automated manner. Web crawler 170 may be able to systematically copy and/or index web-sites and/or web-pages, to automatically gather information from web-sites and/or web-pages, and/or to automatically crawl or browser the Web 190 based on one or more "seed" Uniform Resource Locators (URLs) and based on hyperlinks in previously-crawled web-pages. Web crawler 170 may include multiple or distributed agents, and may include multiple sub-unites, for example, a multi-threaded web-paged downloader, a scheduler, a queue manager, or the like.

Web crawler 170 is able to download and obtain from the Web 190 data, for example, text, images, videos, blog postings, rich content, or the like; as well as metadata, namely, data about data, e.g., a filename of an image file, a filename of a video file, an "alt" tag of an image (namely, text that is rendered or displayed instead of or in addition to a graphical element). The data and metadata downloaded by web crawler 170 is optionally stored (e.g., cached, stored for short-term storage, or stored for long-term storage) in a crawled information repository 175.

Server 120 includes one or more analysis modules and/or feature extractors able to analyze the information stored in the crawled information repository 175, or able to analyze crawled information in substantially real time (e.g., without long-term storage of the crawled information in the crawled information repository 175). For example, an imager analyzer 171 is able to analyze images crawled from the Web 190; a video analyzer 172 is able to analyze videos crawled from the Web 190; a text analyzer is able to analyze textual content crawled from the Web 190; and a metadata analyzer is able to analyze metadata crawled from the Web 190. Analyzers 171-174 may extract personal features 187 from the crawled information, and may store the extracted personal features 187 in an extracted features repository 176. The personal features 187 may include one or more types of web-extracted data, or data extracted from web-content that one or more users publish, upload, or otherwise share using the Web 190 or another global communication network.

For example, the web crawler 170 crawls the Web 190 and downloads the image 181 published by the user of device 101. The image analyzer 171 analyzes the image 181, and identifies the bottle of "Sprite" (or the logo of "Sprite") therein. Accordingly, the image analyzer 171 stores in the extracted features repository 176 a first record indicating that a contact detail of the user of device 101 (e.g., his email address, "User1@domain.com", which is obtained by the web crawler 170) is associated with the word "Sprite", with the word "bottle", and with the term "red shirt" (e.g., if image 181 shows the first user wearing a red shirt).

Similarly, the web crawler 170 crawls the Web 190 and downloads the video 182 published by the user of device 102. The video analyzer 172 analyzes the video 182, and identifies the Statue of Liberty therein. Accordingly, the video analyzer 172 stores in the extracted features repository 176 a second record indicating that a contact detail of the user of device 102 (e.g., his email address, "User2@domain.com", which is obtained by the web crawler 170) is associated with the term "Statue of Liberty".

Furthermore, the web crawler 170 crawls the Web 190 and downloads the blog posting 183 published by the user of device 103. The text analyzer 173 analyzes the blog posting 182, and identifies the phrase "I enjoy drinking Sprite" therein. Accordingly, the text analyzer 173 stores in the extracted features repository 176 a third record indicating that a contact detail of the user of device 103 (e.g., his email address, "User3@domain.com", which is obtained by the web crawler 170) is associated with the word "Sprite".

Additionally, the web crawler 170 crawls the Web 190 and downloads the personal web-page 184 published by the user of device 104. The text analyzer 173 analyzes the personal web-page 184, and identifies the term "Statue of Liberty" and the term "red shirt". Accordingly, the text analyzer 173 stores in the extracted features repository 176 a fourth record indicating that a contact detail of the user of device 104 (e.g., his email address, "User4@domain.com", which is obtained by the web crawler 170) is associated with the term "Statue of Liberty" and with the term "red shirt".

Furthermore, the web crawler 170 crawls the Web 190 and downloads the video 182 published by the user of device 102. The metadata analyzer 174 analyzes metadata associated with the video 182, and identifies the filename "Statue_of_Liberty.jpg" and/or the title "My trip to the Statue of Liberty". Accordingly, the metadata analyzer 174 stores in the extracted features repository 176 a fifth record indicating that a contact detail of the user of device 102 (e.g., his email address, "User2@domain.com", which is obtained by the web crawler 170) is associated with the term "New York City".

Server 120 further includes a clustering module 177 able to perform classification, partitioning, matching, or other types of grouping of multiple records stored in the extracted features repository 176 into one or more groups or clusters, such that members in each cluster share a common attribute or characteristic. For example, the clustering module 177 may create a first cluster, in which the first user and the third user (or their corresponding contact details or email addresses) are members, since both of these users are associated with the word "Sprite". Similarly, the clustering module 177 may create a second cluster, in which the first user and the fourth user (or their corresponding contact details or email addresses) are members, since both of these users are associated with the term "red shirt". Similarly, the clustering module 177 may create a third cluster, in which the second user and the fourth user (or their corresponding contact details or email addresses) are members, since both of these users are associated with the term "Statue of Liberty". Information representing the clustering of records into clusters may be added by the clustering module to the extracted features repository 176 (e.g., by adding data into additional field(s) in suitable records); or may be stored separately, for example, in a linked list or a clusters repository 188.

Server 120 may create and may operate virtual social network(s) based on the information, namely, based on personal features 187 extracted from crawled web-pages and crawled web-content and clustered by the clustering module 177. An invitation module 178 may send an invitation (e.g., by email) to members of a cluster, inviting them to join a virtual social network associated with the common attribute of the cluster. For example, the invitation module 178 may selectively send invitations to the first and third users (and not to the second and fourth users), inviting them to join a virtual social network of users who like to drink "Sprite" or showed a common interest in "Sprite". Similarly, the invitation module 178 may selectively send invitations to the second and fourth users (and not to the first and third users), inviting them to join a virtual social network of users who visited the Statue of Liberty or showed a common interest in the Statue of Liberty.

Upon reception of the invitation, a user may utilize the corresponding device (101-104) to accept the invitation or to reject the invitation. If the user accepts the invitation, an identifier of the user (e.g., his email address, his contact detail, or a user-entered identifier or nickname) is added to a participants table 197 of the virtual social network. If the user rejected the invitation, he is not added to the participants table 197 of the virtual social network. The user's response is transferred back to the invitation module 178 of server 120.

Upon reception of at least one acceptance of invitation, a virtual social network generator 180 generates or creates a virtual social network associated with the common attribute of the relevant cluster; and virtual social network services 161 are provided to users that are included in the participants table 179 of that virtual social network. The virtual social network services 181 are provided, for example, using an application server 162, a web server 163, middleware 164, or other suitable components.

Optionally, clustered information (e.g., clusters of web-extracted personal features) may be transferred to third parties or to external platforms, for example, a vendor or merchant platform 185, which may be associated with a commercial content module 186 able to provide commercial content based on cluster attributes. For example, a cluster of web-extracted personal features may be transferred from the clustering module 177 or from the clustering repository 188 to the merchant platform 185, indicating that the first and third users (or their corresponding contact details or email addresses) are interested in "Sprite"; accordingly, the commercial content module 186 may selectively transfer to these users advertisements, promotions, discounts, coupons, or special offers related to "Sprite" (e.g., a discount coupon for purchasing a "Sprite" bottle, or a discount coupon for purchasing particular brands of soft drinks).

Similarly, for example, a cluster of web-extracted personal features may be transferred from the clustering module 177 or from the clustering repository 188 to the merchant platform 185, indicating that the second and fourth users (or their corresponding contact details or email addresses) are interested in "Statue of Liberty"; accordingly, the commercial content module 186 may selectively transfer to these users advertisements, promotions, discounts, coupons, or special offers related to "Statue of Liberty" (e.g., an advertisement to purchase a book about the history of the Statue of Liberty, or an offer to purchase a miniature replica of the Statue of Liberty).

In some embodiments, image analyzer 171 and/or video analyzer 172 may utilize one or more suitable algorithms for image analysis or video analysis. In some embodiments, imager analyzer 171 and/or video analyzer 172 may utilize facial recognition algorithms, for example, eigenface algorithm, fisherface algorithm, Hidden Markov model, dynamic link matching, or the like. In some embodiments, visual searching algorithms may be used, for example, similar to algorithms used by visual search engines (e.g., "www.LIKE-.com", "www.RIYA.com"). Some embodiments may utilize algorithms to identify objects and features in images and videos using one or more methods described in U.S. Pat. No. 5,640,468 to Hsu, issued on Jun. 17, 1997, titled "Method for Identifying Objects and Features in an Image". In some embodiments, video analysis may include, for example, image analysis of one or more frames of the video.

In some embodiments, image analyzer 171 and/or video analyzer 172 may utilize one or more algorithms adapted to determine a location in which a photograph was taken, algorithms adapted to determine a common landmark or item which appears in multiple images or videos, or algorithms adapted to derive from a photograph a geo-spatial data (e.g., geo-spatial coordinates) of the location in which the photograph was taken, for example, geo-tagging algorithms, GPS-tagging algorithms, one or more methods described online in MAKE magazine by Phillip Torrone on Jul. 3, 2005 at "http://blog.makezine.com/archive/2005/07/how_to_gp-s_tag.html".

Some embodiments may thus utilize personal data obtained by crawling the Web 190, for example, the content of pictures or videos that users publish online (e.g., in Flickr, Phanfare, or other services), content of blogs, personal pages in Facebook, or the like, in order to create a virtual social network based on a common interest or attribute. Some embodiments may create a virtual social network by crawling the content of existing social networks and additional online sources, for example, online images, online videos, blogs, personal web-pages, or the like. Some embodiments may create a virtual social network not necessarily by (or not exclusively by) explicitly merging social graphs of existing virtual social networks and online services, but rather, may create virtual social networks by crawling and analyzing data from the Web 190.

Some embodiments may utilize feature extraction from pictures or videos, as well as content analysis algorithms, in order to identify users who share one or more common attributes. The common attributes may be, for example, common places that people visited, common articles that people possess, or the like. Users that share one or more common attributes may be clustered together. Based on the generated clusters, some embodiments may suggest to users to purchase items or services, based on features and personal data extracted from online content; and optionally taking into account historical purchases made by users.

In some embodiments, for example, once a cluster of users associated with "New York City" is identified, the merchant platform 185 may offer to users of the cluster trips to New York City, trips to other destinations (e.g., London) which visitors to New York City may enjoy, offers to purchase books about New York City, offers to purchase New York City souvenirs or memorabilia, or the like.

In some embodiments, for example, a cluster of users associated with the term "Harry Potter" may be identified based on analysis of online images, based on analysis of online videos, based on analysis of blog postings or personal web-pages, based on analysis of metadata (e.g., "alt" tag, file names), or the like. Once the cluster is identified, the merchant platform may send to some or all members of the cluster selected offers or content, for example, an offer to purchase "Harry Potter" related items or memorabilia (e.g., shirt, cup, toy, or the like), an offer to purchase books or movies that fans of Harry Potter may enjoy, or the like.

In some embodiments, the clustering module 177 may generate a cluster having more than one common attribute, for example, if clusters having a single common attribute have a number of possible members greater than a threshold value. For example, a cluster associated with "New York City" may be associated with 51,000 users; a cluster associated with "Sprite" may be associated with 62,000 users; and a cluster associated with "red shirt" may be associated with 48,000 users; whereas a cluster associated with the three terms together may be associated with only 300 members, and may provide an improved user experience to some users who prefer to participate in smaller virtual social networks.

In some embodiments, the clustering module 177 may generate a cluster based on one or more features extracted from one or more images; and/or one or more features extracted from one or more videos; and/or one or more features extracted from one or more web-pages, personal web-pages, or blog postings; and/or one or more features extracted from one or more metadata items. In some embodiments, at least one of the extracted features that the clustering module takes into account may be a non-textual item or a non-text, for example, an image or a video.

Although portions of the discussion herein relate, for demonstrative purposes, to analysis of images and videos, and to extraction of personal features from images and videos, some embodiments may utilize analysis of other rich-content items or extraction of features from other rich-content items, for example, multimedia items, Flash items, Shockwave items, or the like.

Some embodiments may utilize a client/server architecture, a publisher/subscriber architecture, a centralized architecture, a scalable Peer-to-Peer (P2P) architecture, a fully distributed architecture, a semi-distributed or partially-distributed architecture, or other suitable architectures or combinations thereof.

Figure 2:
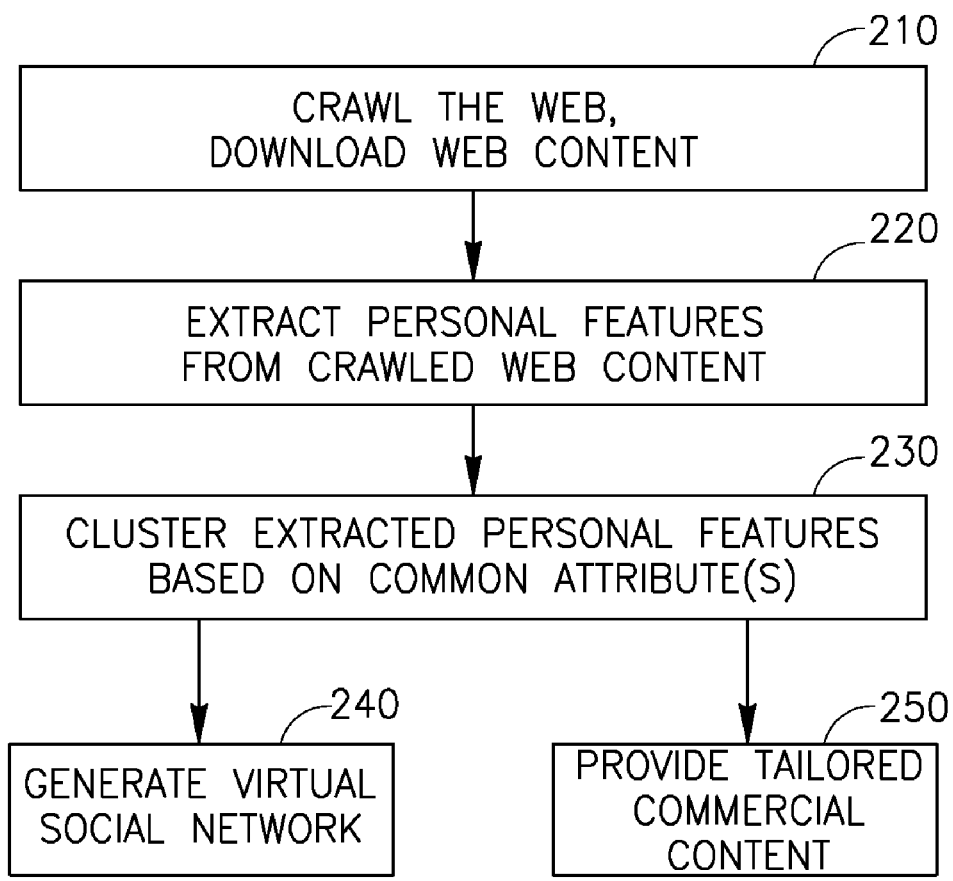
FIG. 2 is a schematic flow-chart of a method of creating virtual social networks based on web-extracted features, in accordance with some demonstrative embodiments of the invention.

FIG. 2 is schematic flow-chart of a method of creating virtual social networks based on web-extracted features, in accordance with some demonstrative embodiments of the invention. Operations of the method may be used, for example, by system 100 of FIG. 1, and/or by other suitable units, devices and/or systems.

In some embodiments, the method may include, for example, crawling the Web and downloading Web content (block 210), e.g., data and/or metadata.

In some embodiments, the method may include, for example, extracting personal features from crawled Web content (block 220).

In some embodiments, the method may include, for example, clustering extracted personal features based on one or more common attributes (block 230).

In some embodiments, the method may include, for example, generating a virtual social network associated with the one or more common attributes (block 240). This may include, for example, sending invitations to members of the cluster to join the virtual social network; receiving acceptance(s) to join the virtual social network; adding the accepting users to a list of participants of the virtual social network; and providing virtual social network services to the participants of the virtual social network.

In some embodiments, the method may include, for example, selectively providing tailored commercial content to one or more members of the cluster based on the one or more common attributes (block 250).

In some embodiments, the operation of block 250 may be performed instead of, or in addition to, the operation of block 240. Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A method for creating virtual social networks based on web-extracted data, the method comprising:

searching through content published in a wide area distributed communication network for identifiers identifying respective publishers of said content, wherein said identifiers are utilized to contact the publisher of said content, if the content is selected for inclusion in a content index in a virtual social network, and wherein the searching process is triggered independent of a keyword search initiated by an individual that is identifiable by a particular search engine used to perform the keyword search;

determining a first identifier associated with a first content item and a second identifier associated with a second content item, wherein each one of the first and second content items comprises one or more of an image, a video, text, and metadata, or a combination thereof;

extracting data corresponding to a first feature from the first content item;

extracting data corresponding to a second feature from the second content item;

recognizing a common attribute that is common to the first and second features; and associating the first identifier and the second identifier such that the publishers of the first content and the second content are indexed into a common group based on the common attribute recognized for the first and the second features.

2. The method of claim 1, wherein the searching through content published in a wide area distributed communication network comprises:
   automatically browsing the World Wide Web using a crawling algorithm.

3. The method of claim 1, further comprising:
   identifying a representation included in the first and second content items, wherein the representation is selected from one or more of:
   a representation of a common landmark,
   a representation of a common person, or
   a representation of a common article.

4. The method of claim 1, wherein at least one of the first and second content items is a non-text content item from which data corresponding to the common attribute is extracted using algorithms for at least one of image recognition, text recognition, geo-spatial data recognition, or geo-tagging.

5. The method of claim 1, comprising:
   sending to the publishers of the first content and the second content invitations to join a virtual social network associated with the common attribute of the first and second features,
   wherein said invitations are sent to the identifiers identifying the respective publishers of said content,
   wherein said identifiers are utilized to contact the publisher of said content, if the content is selected for inclusion in a content index that is to be publically shared among members of the virtual social network, and
   wherein the invitations are submitted by an automated system rather than by an affirmative action taken by an existing member of the virtual social network.

6. The method of claim 5, comprising:
   receiving a signal indicating user acceptance of the invitation; and
   adding the user to the virtual social network associated with the common attribute of the first and second features.

7. The method of claim 6, comprising:
   providing one or more virtual social network services to one or more participants of the virtual social network.

8. The method of claim 1, comprising:
   sending to at least one of the first and second users a commercial content item based on the common attribute of the first and second features.

9. The method of claim 8, wherein the commercial content item is selected from the group consisting of: an advertisement, a promotion, a coupon, a discount representation, an offer to purchase an item, an offer to purchase a service, an offer to receive a free item, and an offer to receive a free service.

10. An apparatus for creating virtual social networks based on web-extracted data, the apparatus comprising:
    a crawler module for searching through content published in a wide area distributed communication network for identifiers identifying respective publishers of said content, wherein said identifiers are utilized to contact the publisher of said content, if the content is selected for inclusion in a content index, and wherein the searching process is triggered independent of a keyword search initiated by an individual that is identifiable by a particular search engine used to perform the keyword search;
    one or more content analyzers for determining a first identifier associated with a first content item and a second identifier associated with a second content item, wherein each one of the first and second content items comprises one or more of an image, a video, text, and metadata, or a combination thereof; extracting data corresponding to a first feature from the first content item; extracting data corresponding to a second feature from the second content item; recognizing a common attribute of the first and second features; and
    a clustering module for associating the first identifier and the second identifier such that the publishers of the first content and the second content are indexed into a common group based on the common attribute recognized for the first and the second features.

11. The apparatus of claim 10, wherein at least one of the first and second content items is a non-text content item from which data corresponding to a common feature is extracted using algorithms for at least one of image recognition, text recognition, geo-spatial data recognition, or geo-tagging.

12. The apparatus of claim 10, wherein the crawler module is to automatically browse the World Wide Web using a crawling algorithm.

13. The apparatus of claim 10, wherein the one or more content analyzers are to identify one or more representations selected from the group consisting of:
    a representation of a common landmark included in the first and second content items;
    a representation of a common person included in the first and second content items; and
    a representation of a common article included in the first and second content items.

14. The apparatus of claim 10, comprising:
    an invitation module for sending to the publishers of the first content and the second content invitations to join a virtual social network associated with the common attribute of the first and second features,
    wherein said invitations are sent to the identifiers identifying the respective publishers of said content,
    wherein said identifiers are utilized to contact the publisher of said content, if the content is selected for inclusion in a content index that is to be publically shared among members of the virtual social network, and
    wherein the invitations are submitted by an automated system rather than by an affirmative action taken by an existing member of the virtual social network.

15. The apparatus of claim 14, wherein the invitation module is to receive a signal indicating user acceptance of the invitation, and wherein the apparatus comprises a virtual social network generator to add the user to the virtual social network associated with the common attribute of the first and second features.

16. The apparatus of claim 15, wherein the virtual social network generator is to provide one or more virtual social network services to one or more participants of the virtual social network.

17. The apparatus of claim 10, comprising:
    a commercial content platform to send to at least one of the first and second users a commercial content item based on the common attribute of the first and second features.

18. The apparatus of claim 17, wherein the commercial content item is selected from the group consisting of: an advertisement, a promotion, a coupon, a discount representation, an offer to purchase an item, an offer to purchase a service, an offer to receive a free item, and an offer to receive a free service.

19. A computer program product comprising a tangible computer readable storage medium including a computer readable program, wherein the computer readable program when executed on a computer causes the computer to:
    search through content published in a wide area distributed communication network for identifiers identifying respective publishers of said content, wherein said identifiers are utilized to contact the publisher of said content, if the content is selected for inclusion in a content index, and wherein the searching process is triggered independent of a keyword search initiated by an individual that is identifiable by a particular search engine used to perform the keyword search;

determine a first identifier associated with a first content item and a second identifier associated with a second content item, wherein each one of the first and second content items comprises one or more of an image, a video, text, and metadata, or a combination thereof;

extract data corresponding to a first feature from the first content item;

extract data corresponding to a second feature from the second content item;

recognize a common attribute of the first and second features; and associate the first identifier and the second identifier such that the publishers of the first content and the second content are indexed into a common group based on the common attribute recognized for the first and the second features.

20. The computer program product of claim 19, wherein the computer readable program when executed on the computer further causes the computer to:

identify one or more representations comprising one or more of:

a representation of a common landmark included in the first and second content items;

a representation of a common person included in the first and second content items; or a representation of a common article included in the first and second content items.

* * * * *